United States Patent [19]

Lewis et al.

[11] Patent Number: 4,717,513

[45] Date of Patent: * Jan. 5, 1988

[54] SILICA INTERCALATED CRYSTALLINE ZIRCONIUM PHOSPHATE-TYPE MATERIALS

[75] Inventors: Robert M. Lewis, Sugarland, Tex.; Rutger A. Van Santen, Amsterdam, Netherlands; Kevin C. Ott, Thousand Oaks, Calif.

[73] Assignee: Shell Oil Company, Houston, Tex.

[*] Notice: The portion of the term of this patent subsequent to Apr. 9, 2002 has been disclaimed.

[21] Appl. No.: 604,543

[22] Filed: Apr. 27, 1984

[51] Int. Cl.[4] ............................ C07F 3/00; B01J 21/16
[52] U.S. Cl. .................................... 556/9; 502/63; 502/80; 502/84; 534/10; 534/15
[58] Field of Search .................... 260/429.1, 448 C; 502/62, 63, 80, 84

[56] References Cited

U.S. PATENT DOCUMENTS 4,510,257  3/1983  Lewis ................................ 260/429.1

OTHER PUBLICATIONS

Clearfield et al., "New Crystalline Phase of Zr Phosphate Processing Ion-Exchange Properties", J. Inorganic Nucl. Chem., 1968, vol. 30, pp. 2249-2258.
Clearfield et al., "The Prep. of Crystalline Zr Phosphate and Some Observations on its Ion Exchange Behavior", J. Inorganic Nucl. Chem., 1964, vol. 26, pp. 117-129.
Clearfield et al., Inorganic Ion Exchange Materials, CRC Press, 1982, pp. 111-132.
Loeppert et al., "Synthesis and Properties of Heat-Stable Expanded Smectite & Vermiculite", Clays & Clay Minerals, vol. 27, No. 3, pp. 201-208, 1979.
Voronkov, "Polyhedral Oligosilsequioxanes & Their Homo Derivatives", Topics in Current Chemistry, 102, pp. 199-236, Spring-Verlag, 1982.

Primary Examiner—Donald P. Walsh
Assistant Examiner—T. J. Wallen

[57] ABSTRACT

The present invention relates to intercalated crystalline zirconium phosphate-types compositions wherein the interlayers of said composition have been intercalated with three-dimensional silicon oxide pillars whereby the pillars comprise at least two silicon atom layers parallel to the clay interlayers.

5 Claims, 6 Drawing Figures

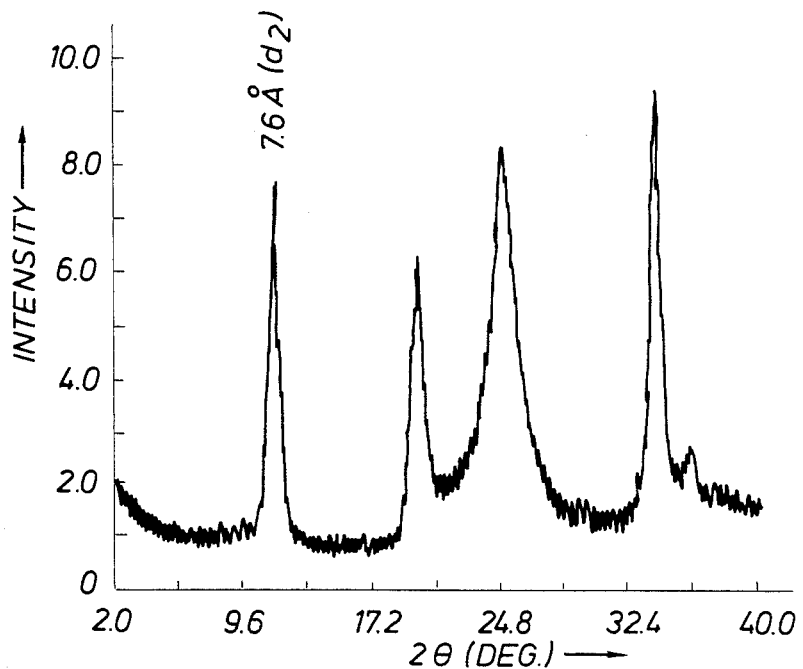
FIG. 5 POWDER X-RAY DIFFRACTOGRAM OF $\alpha$-Zr(HPO$_4$)·H$_2$O
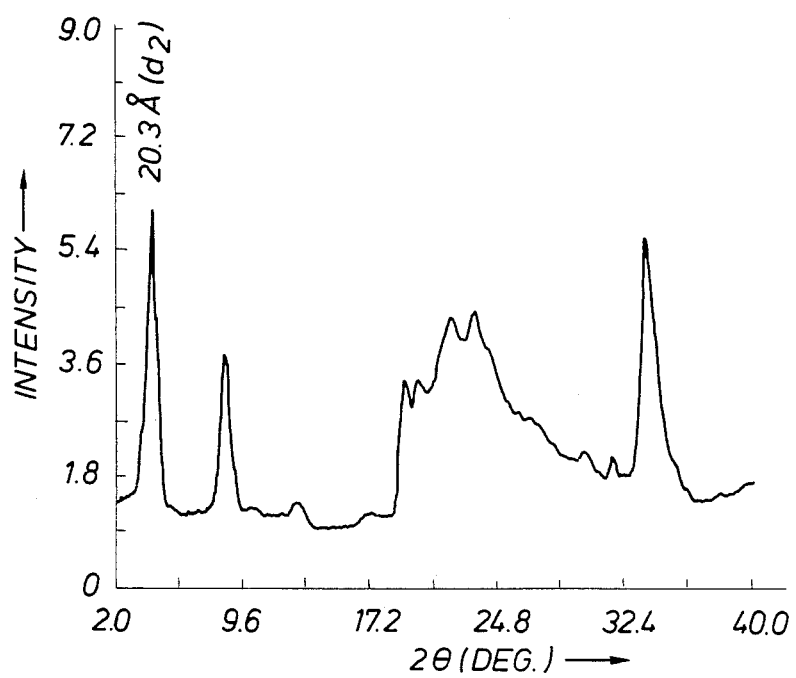
FIG. 6 XRD OF THE ZIRCONIUM PHOSPHATE/PYRIDYL SILICATE INTERCALATE

SILICA INTERCALATED CRYSTALLINE ZIRCONIUM PHOSPHATE-TYPE MATERIALS

FIELD OF THE INVENTION

The present invention relates to intercalated crystalline zirconium phosphate-type materials wherein the interlayers of said zirconium phosphate-type material have been intercalated with three-dimensional silicon oxide pillars whereby the pillars comprise at least two silicon atoms parallel to the interlayers of the zirconium phosphate-type material. These materials are useful for zeolite absorption of large molecules.

BACKGROUND OF THE INVENTION

When solutions of certain metals such as those found in Groups IVA and IVB of the Periodic Table of the Elements the Lanthanides and the Actinides are mixed with oxyanions of elements found in Groups VA and VIB of the Periodic Table of Elements, amorphous gels having limited ion exchange characteristics are precipitated. Certain of these gels have been converted into stoichiometric crystalline phases by refluxing in a solution of a strong acid. Among the crystalline phases prepared in this manner are α-zirconium phosphate; see U.S. Pat. No. 3,416,884, and β and γ-zirconium phosphates, see Journal of Inorganic Nuclear Chemistry, 1968. Vol. 30, pages 2249-2258. Pergamon Press. Abraham Clearfield first discovered that zirconium phosphate gels could be converted to layered, crystalline materials. J. Inorg. Nucl. Chem. 26, 117, 1964. Since that time numerous other materials with differing anions and/or cations have been converted to similar layered, crystalline inorganic materials. For ease of discussion these have frequently been referred to as zirconium phosphate-type materials. These materials have found utility as ion exchange agents, absorption agents (zeolitic), catalysts and catalyst supports.

It has also been noted that the crystalline, layered zirconium phosphate-type materials can be intercalated with various organic agents. See, for example, *Inorganic Ion Exchange Materials*, A. Clearfield, editor, CRC Press, 1982, pp. 111-132. Intercalation of these materials provides certain changes in their properties. By "stretching" apart the crystalline layers, more ready access can be had to the internal surfaces of the crystalline layers. Thus, changes in rates of ion exchange, absorption and catalytic reaction are found. One problem with the use of organic agents to intercalate layered materials is that in the presence of other solvents having intercalating ability, the original intercalating agents will exchange with the solvent, causing a change in properties of the layered material with time. This problem can be obviated by utilizing certain inorganic intercalating or "pillaring" agents. This invention modifies the crystalline zirconium phosphate-type materials by intercalating therein three-dimensional silica pillars. A similar intercalation of clay materials is found in copending application Ser. No. 559,545, filed Dec. 8, 1983, now U.S. Pat. No. 4,510,257.

SUMMARY OF THE INVENTION

The present invention relates to silica intercalated zirconium phosphate-type compositions and methods for producing them. The instant compositions comprise zirconium phosphate-type crystalline, layered materials which have ben intercalated with three-dimensional silicon oxide pillars resulting in compositions having the crystalline layers separated by at least two layers of silicon atoms.

They are useful as catalysts, catalyst supports, ion exchange agents, adsorbents and filtering bed media. Having expanded layers, they are particularly useful for processes involving large or bulky organic molecules.

BRIEF DESCRIPTION OF THE DRAWINGS

FIG. 3 is a representation of four of the homo derivatives of the silsesquioxanes shown in FIG. 2 and which also serve as pillars in the instant compositions.

FIG. 5 is an illustration of an X-ray diffraction scan of the starting material α-Zr(HPO₄)₂.H₂O.

FIG. 6 is an illustration of an X-ray diffraction scan of a composition of the instant invention prepared from α-Zr(HPO₄)₂.H₂O.

DESCRIPTION OF THE PREFERRED EMBODIMENTS

Figure 1:
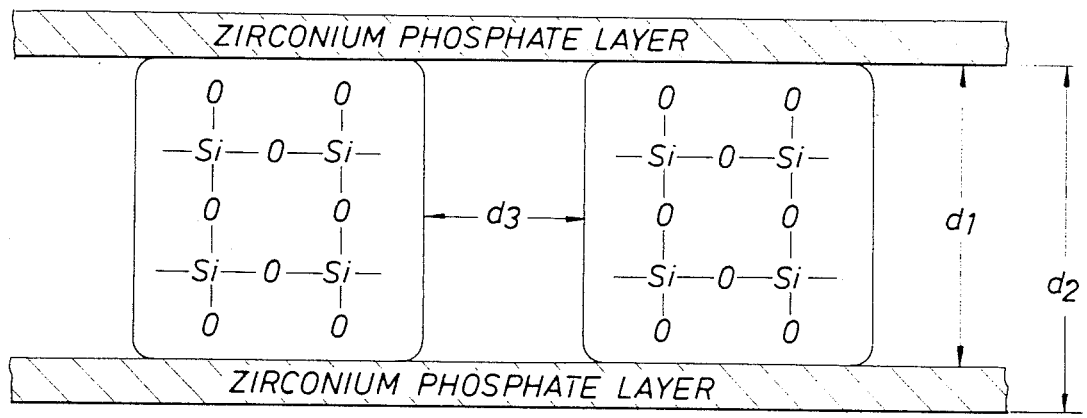
FIG. 1 is a representation of one specific embodiment of the silica intercalated zirconium phosphate-type composition of the instant invention showing two silicon layers intercalated between the zirconium phosphate layers.

The outstanding feature of the present invention is that a layered, crystalline zirconium phosphate-type composition is provided in which the open, porous interlayer network of the crystalline zirconium phosphate-type material is stabilized by intercalated silica structure between the interlayers of the zirconium phosphate-tpe material wherein the silica structures or pillars comprise at least two layers of silicon atoms, resulting in an interlayer separation of greater than about 6 Å. The term "intercalation" is a term of art which indicates the insertion of a material between the layers of a clay or other inorganic crystalline substrate. The article authored by Loeppert, Jr. et al, Clays and Clay Minerals, 27(3), 201-208 (1979) is an example of a reference which uses the term in the same way it is used in the present specification. See also the above cited references, *Inorganic Ion Exchange Materials*. As used herein the term "interlayer spacing" refers to the spacing of adjacent crystalline layers and is represented by the term "$d_2$" in FIG. 1. The term "interlayer separation" refers to the distance between two adjacent crystalline layers and is represented by the term "$d_1$" in FIG. 1. The term "pillar separation" refers to the distance between adjacent silica pillars and is represented by the term "$d_3$" in FIG. 1.

The crystalline zirconium phosphate-type materials which can be utilized as starting materials for the intercalated product have the following general formula:

$$M(OH)_z(HQO_4)_{2-z/2}.xH_2O \qquad (1)$$

wherein M is a metal ion selected from Groups IVA and IVB and the Lanthanide Series and the Actinides Series of the Periodic Table, Q is an anion selected from Groups VA and VIB of the Periodic Table, z is any value from 0 to 2 including fractional values and x is an integer of from 0 to 8, preferably from 1 to 5.

Typical metal ions intended to be incuded in the aboe-identified formula (1) as M are metal ions comprising elements selected from Groups IVA and IVB of the Period Table of Elements are disclosed on pages 392 and 393 of the *Handbook of Chemistry and Physics*, 35th Edition. Specific examples of suitable metal ions include silicon, germanium, tin, lead, titanium, zirconium, cerium, thorium, uranium, and hafnium. With respect to the anions set forth as Q in the aforementioned formula (1), suitable elements include those found in Groups VA and VIB of the aforementioned periodic Table of Elements. Typical examples of such materials include phosphorus, arsenic, antimony, bismuth, chromium, molybdenum and tungsten. M and Q may individually be single ion or a mixture of ions forming a mixed zirconium-phosphate type material.

Although it sometimes happens that (HQO4) groups are replaced by hydroxyl groups to form compounds as defined by equation (1), preferred starting materials are free of hydroxyl groups, i.e., those where z is 0, wherein the formula is $$M(HQO_4)_2 \cdot xH_2O \tag{2}$$

wherein M, Q and x having the definitions set forth above.

Preparations of the various starting materials can be found in the art. For example, U.S. Pat. No. 3,416,884, issued Dec. 17, 1968, describes the preparation of crystalline zirconium phosphates, U.S. Pat. No. 4,180,551, issued Dec. 25, 1979, describes the preparation of various crystalline zirconium phosphates ($\alpha$, $\beta$ and $\gamma$ phases), zirconium arsenate, and tin phosphate. The above cited Clearfield reference, *Inorganic Ion Exchange Materials*, describes and gives references to the preparation of numerous other inorganic, crystalline layered materials, such as titanium phosphate, hafnium phosphate, germanium (IV) phosphate, tin(IV) phosphate, lead(IV) phosphate, titanium arsenate, zirconium arsenate and tin(IV) arsenate. Preferred starting materials are $Zr(HPO_4)_2$ and $Zr(HPO_4)_2 \cdot H_2O$.

In the preparation of the silica intercalated zirconium phosphate-type composition of the present invention, a crystalline zirconium phosphate-type material substrate is impregnated with a polyhedral oligosilsesquioxane-containing reactant which will give rise to a three-dimensional supporting silica structure between the layers of the zirconium phosphate-type material. When the crystalline zirconium phosphate-type material is treated with the silsesquioxane-containing reactant, the silsesquioxane diffuses between the layers and is bound thereto by ionic bonds (through ion exchange) or by physical absorption (e.g., of the van der Waals' or hydrogen bonding type).

Figure 2:
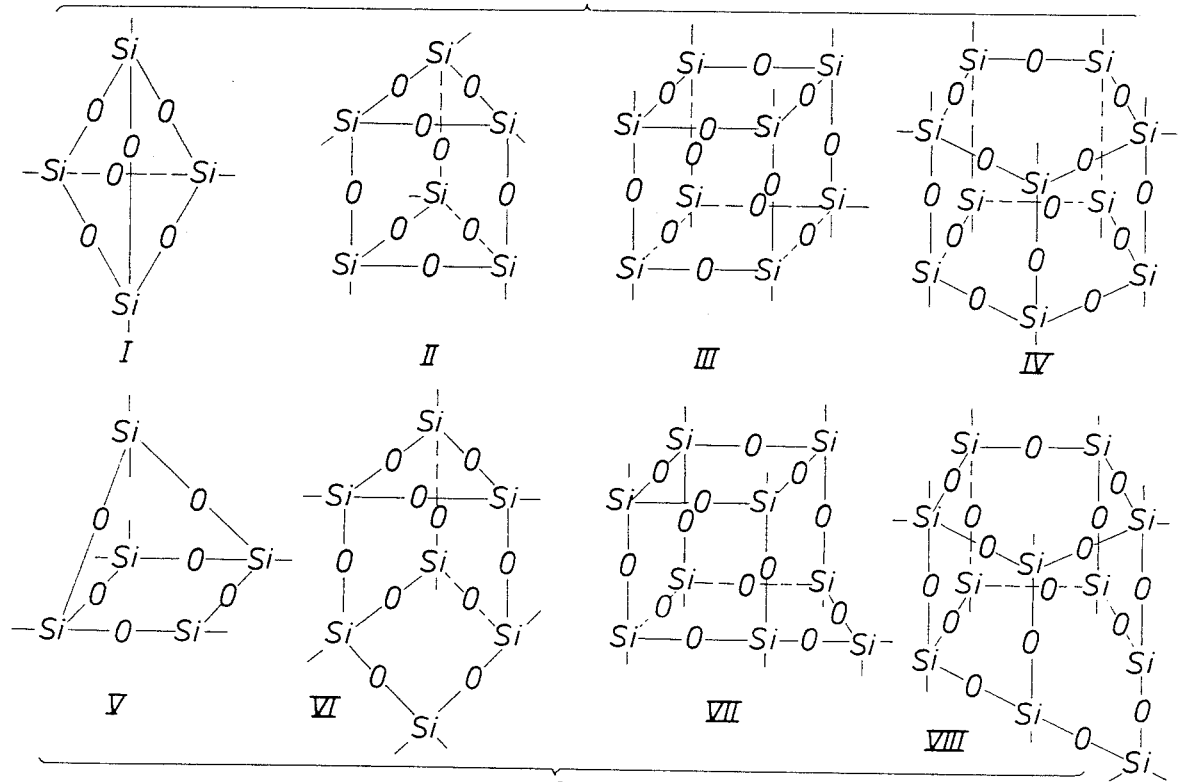
FIG. 2 is a representation of four of the lower polyhedral oligosilsequioxanes which serve as pillars in the intercalated clay composition of the instant invention.

The basic three-dimensional silicate structure which makes up the silica pillars and the silica pillar precursors are described in the article by Voronkov et al, "Polyhedral Oligosilsesquioxanes and their Homo Derivatives", in *Topics in Current Chemistry*, 102, pp 199–236, Spring-Verlag, 1982. These three-dimensional silicate structures are known as polyhedral oligosilsesquioxanes. They are composed of a polyhedral silicon-oxygen skeleton which bear organic or inorganic substituents attached to the silicon atoms. The molecules of these compounds have the general formula $(XSiO_{1.5})_n$ where n is an even number ($n \geq 4$) and X=H, organyl, halogen, hydroxyl, oxy, etc and the X's may be the same or different. The structure of lower oligosilsesquioxanes is represented by structural formulae I–IV illustrated in FIG. 2. These compounds may be considered as the products of complete hydrolytic condensation of the corresponding trifunctional monomers, $XSiY_3$ with Y=Hal, OH, OR, OCOR, etc.

A minor structural variation of the polyhedral oligosilsesquioxanes shown in FIG. 3 are the so-called homooligosilsesquioxanes. They differ from the above described oligosilsesquioxanes in that the Si-O bond of the latter is inserted by a XX'SiO group which is a homologous link in linear and cyclic oligo- and polysiloxanes. Homooligosilsesquioxanes are described by the general formula  wherein m and n are integers and X is as described above. The structure of their lower members is shown by formulae V–VIII illustrated in FIG. 4. These compounds are the by-products of the synthesis of oligosilsesquioxanes and are usually found in minor amounts. Because of the close similarity in structure between the oligosilsesquioxanes and their homo derivatives, the term "oligosilsesquioxane" when used herein will include the polyhedral oligosilsesquioxanes as well as their home derivatives. The pillar material can thus contain a mixture of polyhedral oligosilsesquioxanes and their homo derivatives.

Figure 4:
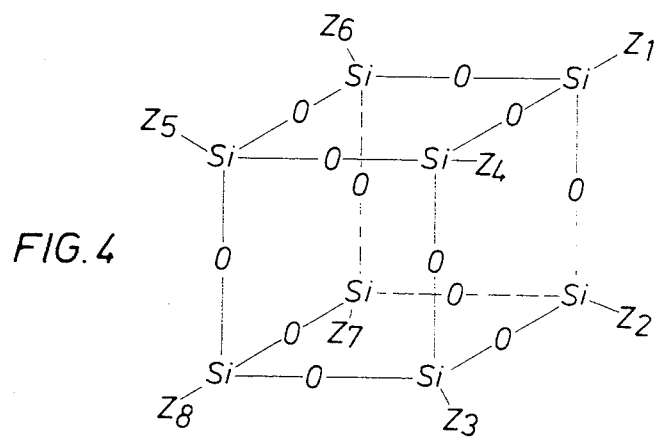
FIG. 4 is a representation of functionalized cubic oligosilsesquioxane.

The pillar materials used to prepare the compositions of the instant invention contain one or more compounds having the general formula $(ZSiO_{1.5})_n(OSiZ_2)_m$ where n and m are zero or an integer and n+m does not equal zero. In many cases, depending on preparative techniques, m will equal zero. A three-dimensional representation of a pillar for n=8 and m=0 is illustrated in FIG. 4. Z is an organic moiety which serves as a coordinating and/or exchange group which allows the entire unit to be brought between the layers of the clay to be pillared. The organic moiety can be chosen such that it contains a coordinating group that is readily intercalated into the layered structure. Examples of coordinating structures include amines, amides, sulfoxides, glycols, alcohols and the like. Alternately, the organic moiety can be chosen such that it contains a cationic species that is readily exchanged into the layered structure. examples of cationic species include ammonium ion, phosphonium ion, sulfonium ion, pyridinium ion and the like. The organic moieties Z on a structure may be the same or different. It is, however, easier to make pillar structures having identical Z's.

There are a number of routes tot he synthesis of oligosilsesquioxane pillar materials. The aforementioned Voronkov et al reference, which is incorporated by reference herein, lists several procedures for the synthesis of the oligosilsesquioxane pillar materials and in general demonstrates the state of the art in the synthesis of the compounds. Illustrative, but non-exclusive reactions for forming the polyhedral silicon-oxygen skeleton of oligosilsesquioxanes are as follows:

1. Hydrolytic condensation of trifunctional monomers, $XSiY_3$ (with X=a chemically stable substituent and Y=a highly reactive substituent).
2. Condensation of Si-functional oligoorganylcyclosiloxanes, $[XYXiO]_m$ (e.g., $[C_2H_5SiHO]_{4.5}$).
3. Co-condensation of organosilicon monomers and/or oligomers of different structure and composition.
4. Thermolysis of polyorganyl silsesquioxanes.

In some cases, these reactions may be combined in order to obtain certain oligosilsesqioxanes or to increase the yield.

The preferred method of preparing the pillar materials starts with the hydrolytic condensation of the trifunctional monomers, $XSiY_3$. Hydrolytic polycondensation of trifunctional monomers of the type $XSiY_3$ leads to cross-linked three-dimensional as well as network and cissyndiotactic (ladder-type) polymers, $(XSiO_{1.5})_n$. With increasing amount of solvent, however, the corresponding condensed polycyclosiloxanes, polyhedral oligosiloxanes and their homo derivatives may be formed. The reaction rate, the degree of oligomerization and the yield of the polyhedral compounds formed strongly depend on the following factors:
1. Concentration of the initial monomer in the solution
2. Nature of solvent
3. Character of substituent X in the initial monomer
4. Nature of functional groups Y in the initial monomer
5. Type of catalyst
6. Temperature
7. Addition of Water
8. Solubility of the polyhedral oligomers formed
9. pH Variations of the above factors have been studied in general and can be found in the literature, such as the aforementioned Voronkov eta al reference; otherwise, they can be determined by one skilled in the art through routine experimentation. Certain of these factors are discussed below.

Due to the extremely high reactivity of trifunctional organosilicon monomers of the above type (mainly organyltrichlorosilanes), the synthesis of the most important oligomers is carried ut in an organic solvent with the addition of water and in the presence of an appropriate acid or base catalyst. The high concentration of the reagents facilitates the formation of high polymers. When diluted solutions are used, intramolecular cyclization predominates leading to polyhedral oligomers along with other volatile products. The most suitable $XSiY_3$ concentration in the preparation of polyhedral silsesquioxanes depends on the character of substituents X and Y in the initial monomer, the solvent nature, the temperature, the amount of water added and the catalyst concentration. The concentration of alkyltrichlorosilanes having lower alkyl substituents, which is most favorable for the preparation of the corresponding polyhedral octamers, ranges from 0.1 to 0.2M. In the $XSi(OR)_3$ hydrolytic polycondensation, more concentrated solutions may be used (0.3–0.5M). The synthesis of oligoalkylsilsesquioxanes bearing higher alkyl substituents requires even more concentrated solutions (2.2M). It should be taken into consideration that too low concentrations of the initial monomer considerably decrease the rate of polymerization.

Oligosilsesquioxanes are formed in polar and nonpolar solvents. Illustrative, but non-limiting examples of solvents that have been found useful include benzene, toluene, cyclohexane, hexamethylsiloxane, acetone, ethyl ether, alcohols, such as methyl, ethyl, propyl and benzyl alcohol, ketones, organic acids, their anhydrides or esters, ketones, toluene, nitrobenzene, pyridine, ethylene glycol dimethyl ether, tetrahydroforan, acetonitrile, diglyme, methyl isobutyl ketone.

Illustrative but non-limiting examples of the substituent X in the initial monomer $XSiY_3$ include the lower alkyls, such as methyl, ethyl, propyl, butyl, hexyl, heptyl, etc., vinyl, allyl, benzyl, 2-methyl benzyl, 4-methyl benzyl, nitrobenzyl, etc., tetramethyl ammonium, etc.

Illustrative but non-limiting examples at the substituent Y in the initial monomer $XSiY_3$ include, hydroxyl, halo such as chloro, bromo, iodo, alkoxy such as methoxy, ethoxy, acyloxy, etc.

The formation of polyhedral oligosilsesquioxanes from linear, cyclic and polycyclic products of the hydrolytic polycondensation of trifunctional monomers, $XSiY_3$, generally occurs only in the presence of either acid or base catalysts. Only the hydrolysis of lower alkyltrichlorosilnes generally requires no special catalyst. In this case the process is autocatalytic and the products are fairly reactive. Catalysts that have been useful include: $HCl$, $H_2SO_4$, $HCl + CH_3COOH$, $H_2SO_4 + SO_3$, $Br_2$, $(C_2H_5)_4NOH$, $KOH$, $C_6H_5CH_2(CH_3)_3NOH$, $(CH_3)_4NOH$, $(C_2H_5)_3N$, etc.

Temperatures for the hydrolytic polycondensation of the monomer $XSiY_3$ are relatively low. Temperatures will vary depending on the monomer, solvent and other reaction conditions. Reported temperatures range from below 0° C. to 160° C.

The formation of oligoorganoylsilsesquioxanes from organyltrichlorosilanes and hydrogen chloride may occur without the addition of water if methanol or ethanol are used as the solvent. However, water is involved in the above reaction since it is generated by the interaction of alcohol with hydrogen chloride. When using the trichlorosilanes as starting materials, the molar ratio of $XSiCl_3:H_2O$ should be 1:1 or greater. Optimum ratios will depend on the particular monomer being utilized.

The Z moiety in the oligosilsesquioxane pillar material $(ZSiO_{1.5})_n$, will be X moiety of the monomer $XSiY_3$, i.e., pillar material $(ZSiO_{1.5})_n =$ condensation product $(XSiO_{1.5})_n$, or the X of the condensation product $(ZSiO_{1.5})_n$ can be modified or replaced by a different moiety through subsequent chemical reaction on $(XSiO_{1.5})_n$. Preferably all the Z's on a pillar material will be the same. However, it is possible, through special techniques such as the hydrolytic co-condensation of 2 or more monomers with different X's, to produce pillar precursors having different Z moieties. It is postulated that the size of the moiety Z is one of the factors that can affect the pore size distribution in the final calcined product. An increase in the bulk or size of the Z-moiety is expected to increase the interpillar distance ($d_3$ in FIG. 2), all other variables being held constant.

The general technique for preparing the silica intercalated crystalline zirconium phosphate type materials of the present invention comprises first preparing a solution of the desirable oligosilsesquioxane pillaring agent containing the appropriate Z-moiety which contains either a cationic and/or co-ordinating atom(s) which will allow the pillaring agent to be ion-exchanged or otherwise intercalated crystalline layer. The zirconium phosphate-type material is then impregnanted with the solution containing the pillaring agent. The zirconium phosphate-type substrate can be swelled with a solvent compound capable of swelling the substrate prior to interaction with the solution containing the pillaring agent, or a solvent compound capable of swelling the clay may be added to the solution containing the pillaring agent. Suitable swelling compounds are polar compounds such as water, ketones like acetone, methylethylketone, etc; sulfoxides like dimethylsulfoxide; formamides, nitrites, amines, ureas and the like. Examples of these swelling agents can be found in the above cited *Inorganic Ion Exchange Materials* at pp. 111–132. The swelling solvent and the solvent containing the pillaring agent should be mutually soluble in the concentration ranges utilized.

The temperature at which the zirconium phosphate-type material is impregnated with the pillaring agent is not critical. Normally, the temperature used is about room temperature, although temperatures ranging from the freezing point to the boiling point of the solution containing the pillaring agent are satisfactory.

The zirconium phosphate-type substrate is impregnated with an amount of pillaring agent sufficient to give an intercalated silica structure. The amount of silica intercalated within the layers should be an amount at least sufficient to maintain the spacing of the expanded zirconium phosphate-type material.

Frequently, the pH of the solution containing the pillaring agent will have to be adjusted to provide for optimum intercalation. For example, when the pillaring agent contains a cationic moiety, the pH should be adjusted above about 6 in order to minimize ion exchange of hydrogen ions in preference to the pillaring agent.

After impregnation, the resulting materials are dried at moderate temperatures, say from about 100° to about 450° C. Temperature higher than about 450° C. for more than two hours cause degradation of these materials and should be avoided.

In general fashion the compositions of the instant invention which comprises zirconium phosphate-type materials intercalated with three-dimentional silica structures (pillars) are prepared by impregnating the zirconium phosphate-type material with a solution containing at least one polyhedral oligosilsesquioxane pillaring agent of the following general formula, $(ZSiO_{1.5})_n(OSiZ_2)_m$ where n and m are zero or an integer and n+m does not equal zero and m+n preferably ranges from 4 to about 12, and Z is an organic moiety containing an atom(s) possessing cationic and/or coordinating characteristics with the proviso that all of the Z's on a particular oligosilsesquioxane need not be the same.

The zirconium phosphate-type materials of the instant invention find use as catalysts, supports for catalytically active materials, ion exchange agents, adsorbents, molecular sieves and filtering bed media.

Generally speaking, the intercalated layered product of the present invention has an interlayer spacing ($d_2$) of greater than about 12 to about 14 Å.

The compositions of the instant invention and the process for preparing them will be further described below by the following illustrative embodiments which are provided for illustration and are not to be construed as limiting the invention.

COMPOSITION PREPARATION

The following illustrates the preparation of composition of the instant invention.

Example 1

A. Pillaring Agent Preparation 4-(2-trichlorosilylethyl)pyridine (192 g of a 25 wt % solution in toluene; 48.0 g (0.199 mole) of silicon reagent) was added to methanol (175 ml) maintained below 30° C. using an ice/water bath. Water (10.8 ml; 0.60 mole) was added to the solution with stirring. After one month, water (200 ml) was added to the solution and the aqueous phase removed (approximate volume 250 ml containing 200 mmol of silicon).

B. Impregnation of $\alpha$-Zr(HPO$_4$)$_2$.H$_2$O Substrate with Pillaring Agent $\alpha$-Zr(HPO$_4$)$_2$.H$_2$O(10 g) was added with stirring to an aliquot (25 ml) of the silicon pillaring solution prepared as described above. The pH was adjusted from 0 to 6 with concentrated ammonium hydroxide. The mixture was stirred for 2 hours, centrifuged/washed, and dried under vacuum.

X-ray studies showed that materials prepared in this fashion possess a gap between the layers of about 13.9 Å. X-ray scans for the untreated $\alpha$-Zr(HPO$_4$)$_2$.H$_2$O and the composition of this example as shown in FIGS. 5 and 6.

Example 2

A. Pillaring Agent Preparation

A solution of 2-(2-silylethyl)pyridine oligosilsesquioxane pillar material was prepared from a methanol solution of 2-(2-trichlorosilylethyl)pyridine (24 grams of 2-(2-trichlorosilylethyl)pyridine in 175 ml of methanol by adding 10.5 ml of water. The mixture was stirred for 1 hour while maintaining the temperature below 30° C.

B. Impregnation of $\alpha$-Zr(HPO$_4$)$_2$.H$_2$O Substrate with Pillaring Agent 5 Grams of $\alpha$-Zr(HPO$_4$)$_2$.H$_2$O in 90 ml of water was added with stirring to an aliquot (37.5 ml) of the silicon pillaring solution prepared as described above. The pH was adjusted from 0 to 6 with concentrated ammonium hydroxide. The mixture was stirred for 2 hours, centrifuged/washed, and dried under vacuum. X-ray studies showed that these materials possess an interlayer separation, $d_1$, of about 19.3 Å.

What is claimed is:

1. A composition comprising crystalline, layered zirconium phosphate-type material having silica pillars intercalated between the interlayers of said material wherein said silica pillars comprise at least two silicon atom layers.

2. The composition of claim 1 wherein said zirconium phosphate-type material has the general formula $$M(OH)_2(HOO_4)_{2-z/2} \cdot xH_2O$$

wherein M is a metal ion selected from Groups IVA and IVB and the Lanthanide Series and the Actinide Series of the Periodic Table, Q is an anion selected from Groups VA and VIB of the Periodic Table Z is any value from O to Z, including fractional values and x is an integer of from 0 to 8.

3. The composition of claim 2 wherein x ranges from 1 to 5.

4. The composition of claim 1, wherein said zirconium phosphate-type material is zirconium monohydrogen-orthophosphate or zirconium monohydrogen-orthophosphate monohydrate.

5. The composition of claim 1, wherein said zirconium phosphate-type material is alpha-zirconium monohydrogen-orthophosphate or alpha-zirconium monohydrogen-orthophosphate monohydrate.

* * * * *